United States Patent Office 3,208,849

Patented Sept. 28, 1965

3,208,849

PLANOGRAPHIC PRINTING PLATE HAVING A FIBROUS ALUMINA COATING THEREON

Robert H. Steinle, Middletown, Conn., assignor to Sperry Rand Corporation, New York, N.Y., a corporation of Delaware No Drawing. Filed June 24, 1963, Ser. No. 290,166
8 Claims. (Cl. 96—75)

This invention relates to an improved metal planographic printing plate and to a method of producing it.

Planographic printing plates have been prepared before using a number of substrates. For example, paper has been coated with a hydrophilic coating such as an aluminum oxide pigment in a film forming material and then coated with a thin film of a material such as a photosensitive diazo compound which on exposure to actinic light is transformed from a water soluble substance into a water insoluble substance. The plate is then developed by washing with water which removes the water soluble photosensitive diazo compound in the places where it has not been hardened by exposure to actinic light. Printing is then effected from a moistened plate using an oily ink which adheres only to the portions where the oleophilic diazo compound was hardened and therefore remained.

Plates made from paper or other materials of limited dimensional stability have not proven to be practical for high grade work and metal plates have therefore been used for many years in the past. These metal plates were ordinarily made from zinc by etching or graining the zinc plate to roughen it and then applying a hydrophilic coating and a light hardenable substance as described above. These plates have given satisfactory results but have a number of drawbacks. The most serious one is that they are not presensitized, that is to say they must be sensitized immediately prior to use, which seriously complicates the production of exposed plates. Also for the very finest work the etching or graining produces a surface which is too rough to give maximum resolution of fine detail, for example, in half tone work. It was these serious drawbacks which led to attempts to prepare presensitized plates which could be stored for a reasonable time and then used. This led to the attempts described above by using substrates other than metal.

Finally, there was produced a metallic presensitized plate described in Patent 2,714,066. This plate used smooth aluminum, although it could be lightly etched if desired, coated with a layer of silicate, for example, from alkali metal silicate solution, and then the photosensitive diazo compound coated onto this hydrophilic coating. The plates produced had reasonable shelf-life and produced prints of good resolution. However, they presented a serious problem in use. After a plate has been exposed and used for the printing it is desirable to be able to remove the ink and then store the plate for a reasonable period of time so that a further run can be made. With the plate described above this is not practical and the instructions with the plate require that in such a case the surface of the plate must be treated with a solution of gum arabic which is then buffed dry. This involves additional treatment if the plate is to be stored.

The present invention produces plates on aluminum which is not deeply grained initially and may be quite bright. The plates are presensitized and after exposure development and printing the ink can be removed and without further treatment the plates can be stored from three to in some cases as much as eight weeks without serious toning up. At the same time the plate is smooth, particularly as compared to the grained zinc plates used before, and gives the highest degree of sharpness and resolution. All this obtained in addition to its very desirable property of reasonable storage time after exposure and running on the press without toning up.

In producing the plates of the present invention, bright aluminum or only very lightly etched aluminum plates are degreased, a necessary prerequisite to making any metal planographic plate, and then are coated with a very thin dispersion of colloidal alumina, for example a dispersion of fibrous alumina monohydrate described in the Bugosh patent, U.S. 2,915,475. In this patent there is disclosed a fibrous alumina monohydrate having the boehmite crystal lattice and made up of alumina fibrils which have a surface area of 250 to 350 $m.^2/g.$ and an average length of 100 to 2,000 millimicrons, and having an axial ratio greater than 20:1. The coating is effected very simply at low temperatures, for example room temperature, by conventional mechanical means such as a roller or by swabbing. This is an important practical advantage in manufacture as it is not necessary to maintain extremely precise film thickness by very sharply controlled coating processes as was required with the aluminum plates coated with silicates referred to above. The coating is quickly insolubilized by drying for a very short period of time at an elevated temperature. Neither time nor temperature is critical and typically the time may be less than a minute, for example, about 30 seconds with temperatures ranging from 100 to 120° C. or slightly higher. A permanently hydrophilic coating results which is highly resistant to abrasion and wear. The coated aluminum sheet is then buffed or otherwise treated to remove any excess coating leaving only an extremely thin layer adhering to the aluminum. The coating adheres with great tenacity to the aluminum and it is possible that there may be some chemical reaction though this is not known. The surface is not bright and shiny but is rather dull without however having any deep indentations as in the case of grained zinc plates.

The aluminum plate with the extremely thin, smooth coating of the water insoluble alumina is then sensitized by immersing in a photosensitive material such as photosensitive diazo compound which adheres to the thin alumina coating. This is followed again by a quick drying at elevated temperature. The plate is then ready for packaging in light type containers in which form it is storage stable for long periods of time and is ready for exposure and development by washing of the portions of the photosensitive diazo compound which have not been insolubilized by actinic light. If desired the image may be developed or made visible by suitable colored lacquers so that a more precise registration can be obtained during printing and so that the pressmen may determine whether the plate is satisfactorily exposed before running off the prints.

As has been pointed out above, the exposed plate can be stored for considerable periods of time which are more than sufficient for the ordinary delays between exposure and printing. No special treating process is necessary and no protective layer needs to be washed off before printing.

The plates of the present invention may be sensitized with a coating of the familiar albumin-ammonium dichromate type. However, photosensitive diazo compounds are preferable as the coating has greater stability and requires less exposure to actinic light through a negative. As a result this is the preferred modification of the present invention and is the one which is described in the specific examples in which the proportions are by weight unless otherwise specified.

*Example 1*

A smooth sheet of aluminum, of .005 inch thickness, is prepared for the coating operation by degreasing with toluene or other suitable solvent. Following the degreasing operation, the foil is immersed in a cleaning solution such as 20% trisodium phosphate. These solutions are maintained at approximately 160° C. and the time of immersion may be from one to three minutes. This treatment will often leave a black scum on the sheet which must be removed by either chemical or mechanical means. A 20% solution of nitric acid in water removes the scum very well. The acid is then washed from the sheet with water and the plate is dried.

The degreased and cleaned sheet is coated with a cold 5% sol of the colloidal alumina by any suitable means such as swabbing with a cotton pad or immersing in a tank.

The colloidal alumina layer is dried in an oven at 130° C. for thirty seconds to one minute to harden and insolubilize it by removal of acetic acid from the sol by evaporation.

The dried aluminum foil with the hydrophilic alumina layer is then coated with a 0.5% to 1.0% solution of a photosensitive diazo compound, namely the zinc chloride double salt of para diazo diphenylamine.

The finished plate is then exposed through a negative for 1–2 minutes. After exposure the unreacted diazo is removed and the plate is run on the lithographic press. The copies obtained are sharp and clear and the background of the plate is clean and will not accept ink in non-imaged areas.

*Example 2*

The degreased and cleaned aluminum is immersed for two minutes in a 2% dispersion of the colloidal alumina which has been heated to 90° C. The hydrophilic coating is dried in an oven at 130° C. for thirty seconds. The light sensitive coating is applied in the same manner as described in Example 1.

*Example 3*

The colloidal alumina coated foil as prepared in Example 1 is dried in the oven and the excess alumina is removed by buffing or by swabbing with a cotton pad. It is then coated with the photosensitive material as described above. It is imaged and developed in the conventional way and run on a lithographic press for a large number of copies.

*Example 4*

The aluminum foil is solvent degreased as in Example 1. The sheet is not cleaned with trisodium phosphate but the 5% alumina coating is applied to the sheet by immersion or swabbing with a cotton pad. It is dried and sensitized in the foregoing manner.

*Example 5*

A sheet of aluminum treated as to produce a definite grained effect by one of a number of means, such as, sand blasting, scratching with a metal brush or chemically etching is degreased, cleaned, and coated with the colloidal alumina sol. The hydrophilic sheet is then treated with the photosensitive coating and dried. After exposure to an ultraviolet source, the non hardened areas of the light sensitive coating may be washed away with water or a commercial acidified gum solution leaving the exposed photosensitive coating hydrophobic and the hydrophilic surface in the unexposed areas. The image is distinctly visible but may be made more so by using a developing ink.

The imaged plate may then be run on the press in the conventional manner.

The specific example above describes the use of a particular light sensitive diazo compound which gives excellent results. It should be understood however that the present invention is in no sense limited to its use. As a matter of fact, as pointed out above, the present invention does not affect the choice of any particular photosensitive diazo compound or other light sensitive material and any of the well known ones may be used. Accordingly in the broader aspects of the present invention it is not limited to any particular light sensitive substance. The advantages of the extremely hard and storable coating of the special alumina employed in the practices of this invention is obtainable with any light sensitive material. This is an important practical advantage of the present invention since it is not restricted and the best light sensitive material for particular purposes may be chosen.

Another advantage of the present invention, when the preferred photosensitive diazo materials are used, is that it renders the plate very sensitive and quite short exposures can be used, for example with a typical ultraviolet light source exposures of from one-half to one and one-half minutes through a negative produce excellent exposed plates from which good prints may be obtained. The very hard layer also makes possible a large number of copies from a particular plate. In this respect it matches the best of the metal plates which have been made before.

I claim:

1. A presensitized planographic plate comprising in combination, a degreased aluminum substrate, a hard, adherent, thin film layer consisting essentially of water-insoluble fibrous alumina having the boehmite crystal lattice structure on the plate, and a light-sensitive coating on the layer of said fibrous alumina.

2. A presensitized planographic plate according to claim 1 in which the light sensitive coating comprises a light sensitive diazo compound.

3. A presensitized planographic plate according to claim 1 in which a light-sensitive coating comprises the zinc chloride double salt of para diazo diphenylamine.

4. A presensitized planographic plate according to claim 1 wherein the light-sensitive coating comprises albumin-ammonium dichromate.

5. A process of preparing a presensitized planographic plate which comprises, coating an aqueous dispersion consisting essentially of water-insoluble fibrous alumina having the boehmite crystal lattice structure on a degreased aluminum surface, drying the resulting coating of the fibrous alumina, mechanically removing excess fibrous alumina coating to leave a microscopically thin coherent layer of fibrous alumina on the aluminum surface and applying to the thus-produced coating of the fibrous alumina a layer of photosensitive material.

6. A method according to claim 5 in which the photosensitive material comprises a photosensitive diazo compound.

7. A process in accordance with claim 5 wherein said photosensitive material comprises the zinc chloride double salt of para diazo diphenylamine.

8. A process in accordance with clam 5 wherein said photosensitive material comprises albumin-ammonium dichromate.

References Cited by the Examiner

UNITED STATES PATENTS

| | | | |
|---|---|---|---|
| 2,709,655 | 5/55 | Frederick | 96—75 |
| 2,714,066 | 7/55 | Jewett et al. | 96—33 X |
| 2,805,159 | 9/57 | Unkauf | 96—75 |
| 2,915,475 | 12/59 | Bugosh | 252—313 |
| 2,946,683 | 7/60 | Mellan et al. | 96—75 |
| 3,085,008 | 4/63 | Case | 96—75 |

FOREIGN PATENTS

| | | |
|---|---|---|
| 815,471 | 6/59 | Great Britain. |

OTHER REFERENCES

Derwent Belgian Patents Report, vol. 76B, June 30, 1961, pages A15–A16, abstract of Belgian 598,570.

NORMAN G. TORCHIN, *Primary Examiner.*